No. 707,685. Patented Aug. 26, 1902.
R. C. FAY.
ADJUSTABLE OR SEPARABLE PULLEY.
(Application filed Mar. 25, 1902.)
(No Model.)
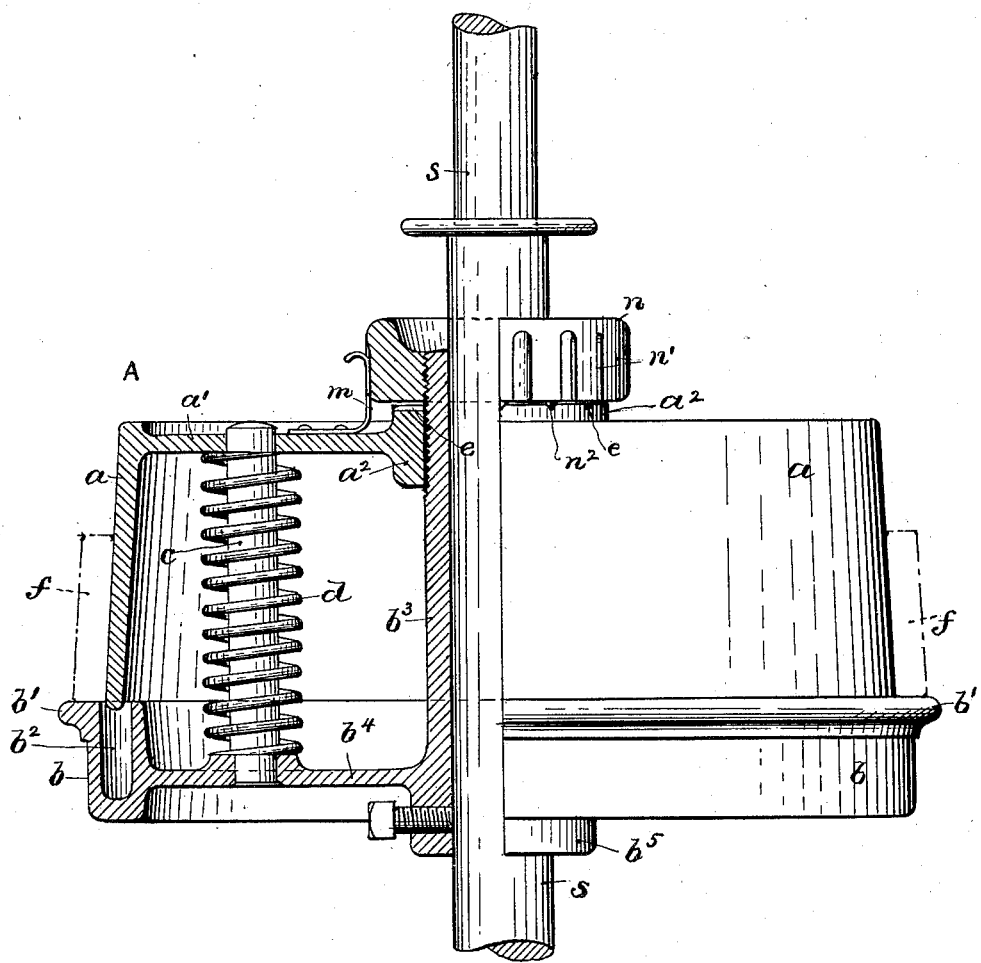
WITNESSES.
William A. Sullivan
Stephen C. Harris
INVENTOR.
Rimmon C. Fay.

UNITED STATES PATENT OFFICE.

RIMMON C. FAY, OF PAWTUCKET, RHODE ISLAND, ASSIGNOR TO THE EASTON & BURNHAM MACHINE COMPANY, OF PAWTUCKET, RHODE ISLAND.

ADJUSTABLE OR SEPARABLE PULLEY.

SPECIFICATION forming part of Letters Patent No. 707,685, dated August 26, 1902.

Application filed March 25, 1902. Serial No. 99,860. (No model.)

*To all whom it may concern:*

Be it known that I, RIMMON C. FAY, a citizen of the United States of America, and a resident of the city of Pawtucket, in the county of Providence and State of Rhode Island, have invented certain new and useful Improvements in Adjustable or Separable Pulleys, of which the following is a specification.

My invention relates to certain novel improvements in expansion or adjustable pulleys; and it consists, essentially, of a central or hub member provided with a flange having a comparatively deep annular recess formed in its outer or peripheral portion, a suitably-guided spring-pressed beveled rim member adapted to receive a belt, having its edge arranged to enter said recess, and a nut or other analogous device in engagement with said hub and rim members, whereby the adjustment of the pulley may be readily and easily effected.

In expansible pulleys as usually constructed the rim portion consists of a series of sections which are capable of being actuated in a radial direction by means of screws, gearing, &c. As thus constructed the relative or maximum and minimum diameters of the pulley are or may be comparatively large. In my improved pulley the rim thereof is integral and slightly beveled or cone-shaped, the degree of adjustment being such that the velocity ratio of the belt from the normal speed is comparatively small. This feature is desirable in certain types of machines—as, for example, in thread-winding machines, where very close and accurate adjustments are required in order to maintain a substantially uniform peripheral speed to the cop or package being produced.

I am of course aware that belt-driven cone-pulleys have been used wherein the belt is moved along the face of the pulley in different working planes in order to vary the speed. Such former constructions I disclaim.

In my improved pulley the position of the rim portion is adapted to be changed with respect to the grooved part of the fixed or hub member, the means for effecting such change or adjustment being such that the working diameter may be made slightly larger or smaller in an expeditious manner, whereby the pulley imparts to the belt a corresponding change in the speed ratio.

In my improved pulley A, which is represented both sectionally and in elevation in the accompanying drawing, I employ a main or driving member $b$, adapted to be secured to a shaft or spindle $s$ in any suitable manner. Said member $b$ has a hub $b^3$, its upper portion being screw-threaded. It also has a web $b^4$, terminating outwardly in the enlarged flange $b'$, in which latter is formed a deep annular recess $b^2$, arranged both parallel and concentric with the longitudinal axis of the hub. To said web $b^4$ are secured vertically-arranged combined driving and guide pins $c$, (one only being shown,) on each of which is mounted a helical spring $d$. The other or fellow member $a$ of the pulley has a slightly-beveled rim, provided with a web $a'$, terminating in a central hub $a^2$, through which latter the threaded part of the hub $b^3$ slidably passes. Said web $a'$ forms a bearing for the upper portion of the guide-pins $c$, as clearly shown. To the upper or free end portion of the screw-threaded part of the hub extending through that of the member $a$ is fitted an annular nut $n$, having, as drawn, a series of shallow grooves $n'$ formed in its periphery, adapted to receive a spring $m$, secured to the web $a'$. By means of this arrangement the nut is maintained in position after being properly adjusted, the device constituting a check or lock for the nut. To the under side of the nut is secured one or more small V-shaped pins $n^2$, adapted to engage radially-arranged notches $e$, formed in the face or end of the hub $a^2$, the said springs $c$ keeping the member $a$ in slidable yielding engagement with the member $b$.

It is to be noted that the pulley A may be employed as a driving-pulley to transmit power therefrom through a belt $f$ (indicated by dotted lines) to any suitably-arranged driven or receiving pulley connected therewith. Conversely, power may be transmitted from a driving-pulley via said belt to the pulley A, the latter in such case being the driven pulley. In either case the pins $c$ form a positive connecting medium between the members $a$ and $b$, thereby insuring that when in use said members always revolve in unison.

In order to adjust the pulley A, say, from the maximum to a slightly-smaller diameter, the nut $n$ is turned in the proper direction, resisted by the yielding springs $m$ and $d$, thereby forcing the rim member $a$ downwardly or endwise into the annular recess $b^2$, registering with the lower edge of said member and compressing the springs $d$. When the desired adjustment has been thus effected, a slight turn of the nut will insure the seating of the pins $n^2$ and locking-spring $m$ into the respective notches $e$ and $n'$. Assuming now that the rotary speed of the shaft or spindle $s$ is uniform and that power is to be transmitted from the pulley A through the belt $f$, the velocity ratio of the latter will be slightly reduced, corresponding to the difference in circumference at the maximum and minimum points of adjustment of the rim at which the belt travels.

While I have represented the pulley as having the flange $b'$ at the bottom, it is obvious that it may be inverted, or, if desired, the shaft may be mounted to revolve in a horizontal plane. In any event, however, the tendency of the belt when in use will be to "run" to the high side of the pulley or to the portion of the rim having the greatest circumference. The flange $b'$ also forms a guard to maintain the belt in position.

I claim as my invention and desire to secure by United States Letters Patent—

1. The adjustable or separable pulley herein described, the same comprising a main or head member provided with a guide-flange having a comparatively deep annular peripheral recess therein, an endwise-movable rim member having a beveled face arranged to enter said recess, said two members when in action always revolving in unison, and means for changing the relation or relative position of the head and rim members, thereby varying the speed of the belt or pulley, as the case may be, substantially as hereinbefore described.

2. In a pulley of the class described, a head member adapted to be secured to a shaft, having an outer or peripheral guide-flange for the adjacent edge of the belt and a comparatively deep annular recess or groove contiguous to said flange, in combination with a rim member having a beveled face adapted to enter said recess, means uniting or connecting said head and rim members whereby when in action they revolve in unison, and adjusting mechanism for changing the position of the rim endwise or longitudinally with respect to the flange member, substantially as hereinbefore described and for the purpose set forth.

3. In a pulley of the class described, a head member provided with a peripheral guide-flange for the belt and also having a screw-threaded hub and guide-pins, in combination with a rim member having a beveled face slidably mounted on said hub and pins, springs interposed between the head and rim members, and a nut fitting said screw-threaded portion of the hub, substantially as described and for the purpose set forth.

4. An adjustable or separable pulley provided with longitudinally-separated spring-pressed head and rim members arranged when in use to always revolve in unison, said rim having a beveled face, a lock-nut fitted to the hub of said head member, whereby the relation of the rim to the head member may be adjusted longitudinally of the shaft and maintained in position, and having that portion of the said rim adapted to enter a comparatively deep annular recess formed in said head member, thereby changing the working diameter of the pulley, substantially as described.

Signed at Providence, Rhode Island, this 20th day of March, 1902.

RIMMON C. FAY.

Witnesses:
GEO. H. REMINGTON,
WILLIAM A. SULLIVAN.